United States Patent
Fiset

(10) Patent No.: US 7,262,533 B2
(45) Date of Patent: Aug. 28, 2007

(54) ENERGY TRANSFER APPARATUS

(75) Inventor: Jean Fiset, Beaumont (CA)

(73) Assignee: Concept Fiset Inc., Lévis (Quebec) (CA)

(*) Notice: Subject to any disclaimer, the term of this patent is extended or adjusted under 35 U.S.C. 154(b) by 0 days.

(21) Appl. No.: 11/379,689

(22) Filed: Apr. 21, 2006

(65) Prior Publication Data

US 2006/0181170 A1 Aug. 17, 2006

Related U.S. Application Data

(63) Continuation of application No. PCT/CA2004/001853, filed on Oct. 21, 2004.

(60) Provisional application No. 60/512,696, filed on Oct. 21, 2003.

(51) Int. Cl.
 *H02K 16/00* (2006.01)
(52) U.S. Cl. .................. 310/115; 310/113; 310/114
(58) Field of Classification Search ......... 310/112–115
 See application file for complete search history.

(56) References Cited

U.S. PATENT DOCUMENTS

| | | | |
|---|---|---|---|
| 489,709 A | 1/1893 | Hering | |
| 2,153,252 A | 4/1939 | Hunsdorf | |
| 2,170,836 A * | 8/1939 | Wooster | 310/102 R |
| 2,191,872 A | 2/1940 | Upton | |
| 2,659,044 A * | 11/1953 | MacNeil | 322/24 |
| 2,724,080 A | 11/1955 | Sheperdson | 318/46 |
| 2,779,548 A | 1/1957 | Helmer | |
| 2,931,928 A | 4/1960 | Fehn | |
| 3,539,887 A * | 11/1970 | Dennick | 318/8 |
| 4,056,746 A | 11/1977 | Burtis | |
| 4,087,698 A | 5/1978 | Myers | |
| RE29,775 E | 9/1978 | Helmer | |
| 4,260,919 A * | 4/1981 | Fleming | 310/113 |
| 4,291,233 A | 9/1981 | Kirschbaum | |
| 4,405,028 A | 9/1983 | Price | |
| 5,260,617 A | 11/1993 | Leibowitz | |
| 5,418,446 A * | 5/1995 | Hallidy | 322/28 |
| 5,434,454 A * | 7/1995 | Farkas | 290/4 R |
| 5,844,342 A * | 12/1998 | Miyatani et al. | 310/114 |
| 6,433,451 B1 | 8/2002 | Cherciu | |
| 2006/0181170 A1 * | 8/2006 | Fiset | 310/113 |

* cited by examiner

*Primary Examiner*—Karl Tamai
(74) *Attorney, Agent, or Firm*—Ogilvy Renault, LLP; Isabelle Chabot

(57) ABSTRACT

A motor and a generator both comprising a rotor and a stator, wherein said rotor and said stator of both said motor and said generator can rotate about a common axis, and wherein both said stators are coupled, and both said rotors are coupled, for one to induce rotation to the other, and wherein the rotation energy may be transferred to a system.

5 Claims, 5 Drawing Sheets

ENERGY TRANSFER APPARATUS

CROSS-REFERENCE TO RELATED APPLICATION

This application is a continuation of PCT patent application serial number PCT/CA2004/001853 filed Oct. 21, 2004, designating the United States, the specification of which is hereby incorporated by reference and claims priority of U.S. provisional patent application 60/512,696 filed on Oct. 21, 2003, the specification of which is hereby incorporated by reference.

FIELD OF THE INVENTION

The present invention relates to generators and motors, and more specifically, to configurations of generators and motors with two rotating parts.

BACKGROUND OF THE INVENTION

Machines used to transform other forms of energy (such as heat) into mechanical energy are known as engines. The electric motor transforms electrical energy into mechanical energy. Its operation is the reverse of that of the electric generator, which transforms the mechanical energy (for example of falling water or steam) into electrical energy.

The generator operates on the principle of electromagnetic induction. When a conductor passes through a magnetic field, a voltage is induced across the ends of the conductor. The generator is simply a mechanical arrangement for moving the conductor and leading the current produced by the voltage to an external circuit, where it actuates devices that require electricity.

In the simplest form of generator the conductor is an open coil of wire rotating between the poles of a permanent magnet. During a single rotation, one side of the coil passes through the magnetic field first in one direction and then in the other, so that the induced current is alternating current (AC), moving first in one direction, then in the other. Each end of the coil is attached to a separate metal slip ring that rotates with the coil. Brushes that rest on the slip rings are attached to the external circuit. Thus the current flows from the coil to the slip rings, then through the brushes to the external circuit.

In order to obtain direct current (DC), i.e., current that flows in only one direction, a commutator is used in place of slip rings. The commutator is a single slip ring split into left and right halves that are insulated from each other and are attached to opposite ends of the coil. It allows current to leave the generator through the brushes in only one direction. This current pulsates, going from no flow to maximum flow and back again to no flow. A practical DC generator, with many coils and with many segments in the commutator, gives a steadier current. There are also several magnets in a practical generator.

In any generator, the whole assembly carrying the coils is called the armature, or rotor, while the stationary parts constitute the stator. Except in the case of the magneto, which uses permanent magnets, AC and DC generators use electromagnets. Field current for the electromagnets is most often DC from an external source. The term dynamo is often used for the DC generator; the generator in automotive applications is usually a dynamo. An AC generator is called an alternator.

Conventional electric motors work the inverse way, i.e. transforming electrical energy into mechanical energy via induction. When an electric current is passed through a wire loop that is in a magnetic field, the loop will rotate and the rotating motion is transmitted to a shaft, providing useful mechanical work. The traditional electric motor consists of a conducting loop that is mounted on a rotatable shaft. Current fed in by carbon blocks, called brushes, enters the loop through two slip rings. The magnetic field around the loop, supplied by an iron core field magnet, causes the loop to turn when current is flowing through it.

In an alternating current (AC) motor, the current flowing in the loop is synchronized to reverse direction at the moment when the plane of the loop is perpendicular to the magnetic field and there is no magnetic force exerted on the loop. Because the momentum of the loop carries it around until the current is again supplied, continuous motion results. In alternating current induction motors the current passing through the loop does not come from an external source but is induced as the loop passes through the magnetic field.

In a direct current (DC) motor, a device known as a split ring commutator switches the direction of the current each half rotation to maintain the same direction of motion of the shaft. In any motor the stationary parts constitute the stator, and the assembly carrying the loops is called the rotor, or armature. As it is easy to control the speed of direct-current motors by varying the field or armature voltage, these are used where speed control is necessary. The speed of AC induction motors is set roughly by the motor construction and the frequency of the current; a mechanical transmission must therefore be used to change speed. In addition, each different design fits only one application. However, AC induction motors are cheaper and simpler than DC motors. To obtain greater flexibility, the rotor circuit can be connected to various external control circuits.

Brushless DC motors are constructed in a reverse fashion from the traditional form. The rotor contains a permanent magnet and the stator has the conducting coil of wire. By the elimination of brushes, these motors offer reduced maintenance, no spark hazard, and better speed control. Synchronous motors turn at a speed exactly proportional to the frequency. The very largest motors are synchronous motors with DC passing through the rotor.

The efficiency of any machine measures the degree to which friction and other factors reduce the actual work output of the machine from its theoretical maximum. A frictionless machine would have an efficiency of 100%. A machine with an efficiency of 20% has an output only one fifth of its theoretical output.

Generators and motors have a limited efficiency ratio which typically decreases with the increase in temperature resulting from a high frequency of revolutions of the rotor during operation. Hence, upgrades to generators and motors are continually sought to increase efficiency, such as providing fans to decrease operating temperature.

Some electrical machines, either generators or motors, are built with two rotating parts in order to yield a better efficiency ratio. An example of such a machine with a rotational stator and a rotational rotor is found in U.S. Pat. No. 6,433,451 to Cherciu.

SUMMARY OF THE INVENTION

A motor and a generator both comprising a rotor and a stator, wherein said rotor and said stator of both said motor and said generator can rotate about a common axis, and wherein both said stators are coupled, and both said rotors are coupled, for one to induce rotation to the other, and wherein the rotation energy may be transferred to a system.

According to one broad aspect of the present invention, there is provided an energy transfer apparatus for operating on electrical power comprising a motor comprising a rotatable stator and a rotatable rotor, the rotor being supported for rotation about a common central axis with said stator under the influence of electromagnetic fields developed in the stator; a generator comprising a rotatable stator and a rotatable rotor, the rotor being supported for rotation about a common central axis with said stator under the influence of electromagnetic fields developed in the stator; means physically coupling at least one of the rotor and the stator of the motor to at least one of the rotor and the stator of the generator; means for applying power from an external source to the stator of the motor; and at least one output shaft coupled to be driven by one of the stator and the rotor of the generator, whereby the output shaft can be driven at speeds in excess of the speed of the motor.

According to another broad aspect of the present invention, there is provided a method for transferring energy, comprising: providing a motor comprising a rotatable stator and a rotatable rotor, the rotor being supported for rotation about a common central axis with said stator under the influence of electromagnetic fields developed in the stator; providing a generator comprising a rotatable stator and a rotatable rotor, the rotor being supported for rotation about a common central axis with said stator under the influence of electromagnetic fields developed in the stator; physically coupling at least one of the rotor and the stator of the motor to at least one of the rotor and the stator of the generator; applying power from an external source to the stator of the motor; and coupling at least one output shaft to be driven by one of the stator and the rotor of the generator, whereby the output shaft can be driven at speeds in excess of the speed of the motor.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
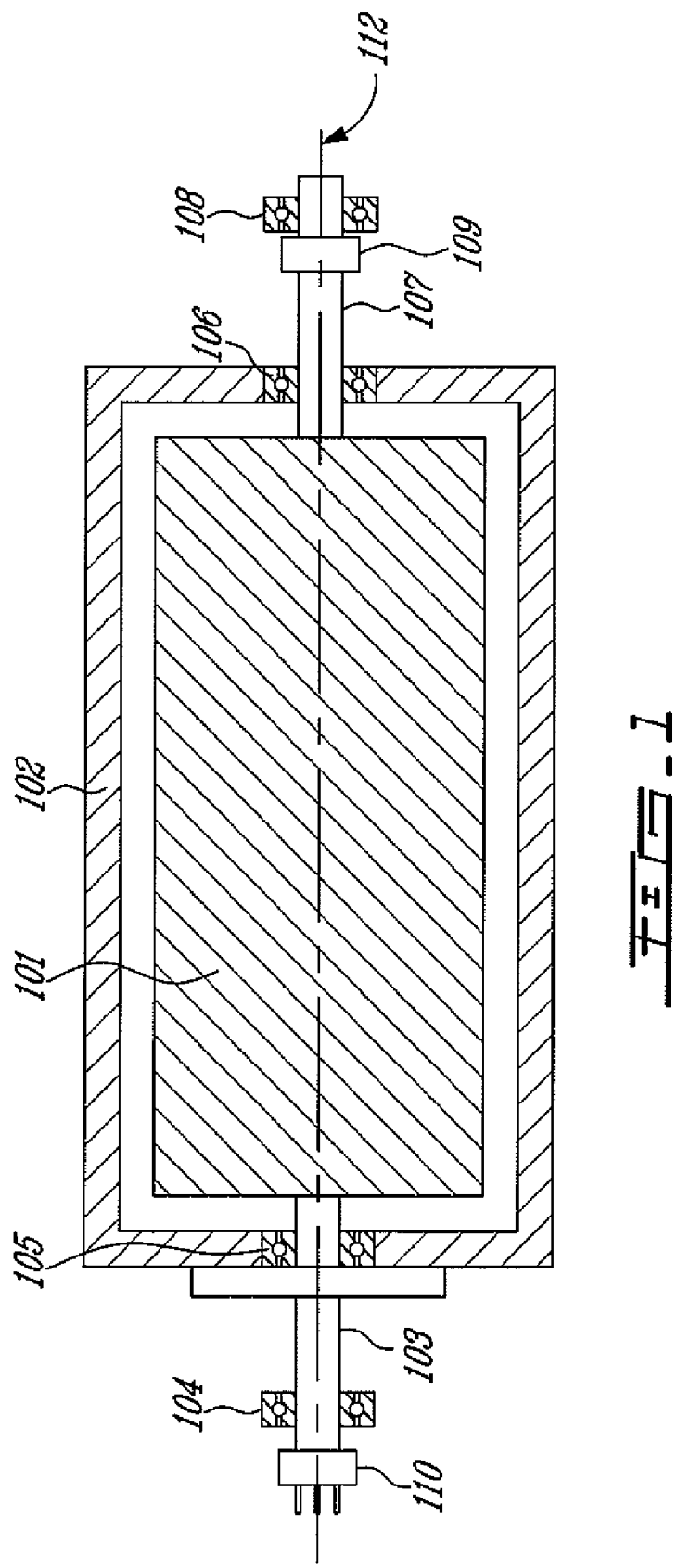
FIG. 1 is a cross-sectional view of a generator for use with the present invention.

Referring now to FIG. 1, as opposed to a conventional generator where the stator is stationary and the rotor is mounted to the stator so as to be pivotally mounted thereabout, a bi-rotary generator (herein referred to simply as 'generator') is illustrated, comprising a rotor 101 and a stator 102 that can both independently pivot about a longitudinal axis. The term stator is used for the outer rotational cylinder by analogy with a conventional generator, even though the stator used can rotate. In operation, the rotor and the stator are coupled by electromagnetic induction. The rotation of the rotor 101 relatively to the stator 102 produces an electrical current which may be used for many applications.

A bracket is affixed to the stator 102 and has a stator shaft 103. The rotor 101 also comprises a rotor shaft 107. The bracket pivots with the stator 102, whereas rotor shaft 107 pivots with the rotor 101. The stator 102 and rotor 101 pivot concentrically around a central axis 112 via bearings 104, 105, 106, 108. Spacers 109, 110 are also used.

Figure 2:
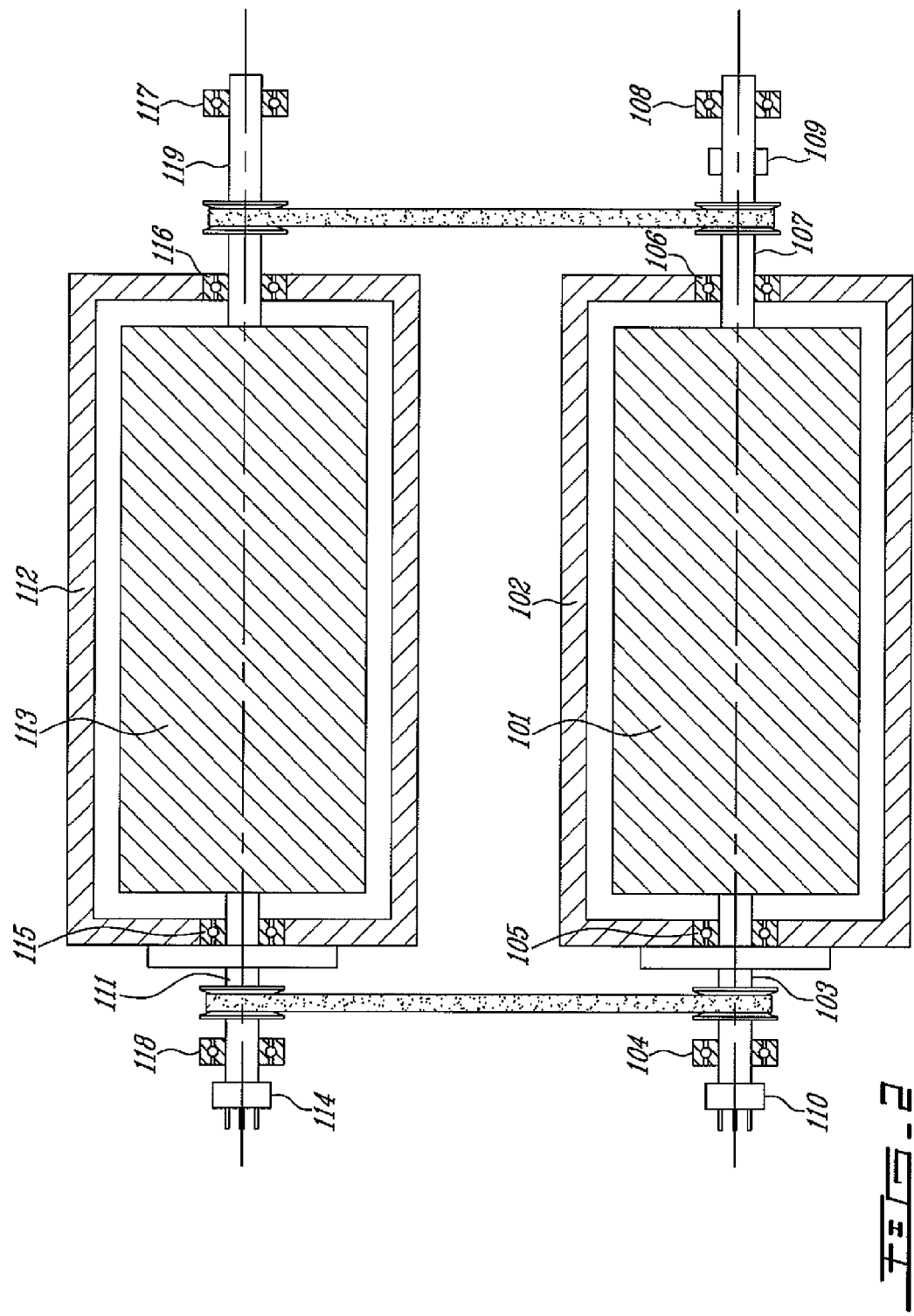
FIG. 2 is a cross-sectional view of a generator coupled to a motor according to one embodiment of the invention.

In FIG. 2, the generator of FIG. 1 is shown at the bottom, with its pivoting stator 102 and rotor 101. A motor is also shown at the top, identical to the generator. In the present description, the motor has been depicted as being identical to the alternator for simplicity, although generators used in the art like alternators and dynamos have sizes and configurations which are optimized to produce electrical energy instead of optimized to produce mechanical energy like motors. The motor comprises stator 112 and rotor 113, stator shaft 111, rotor shaft 119, bearings 115, 116, 117, 118, and spacer 114.

In an embodiment of the invention, the motor stator 112 is coupled to the generator stator 102 and the motor rotor 101 is coupled to the generator rotor 113. When the motor is activated, the fact that both sets of coupled components can pivot produces new and unexpected results.

Figure 3:
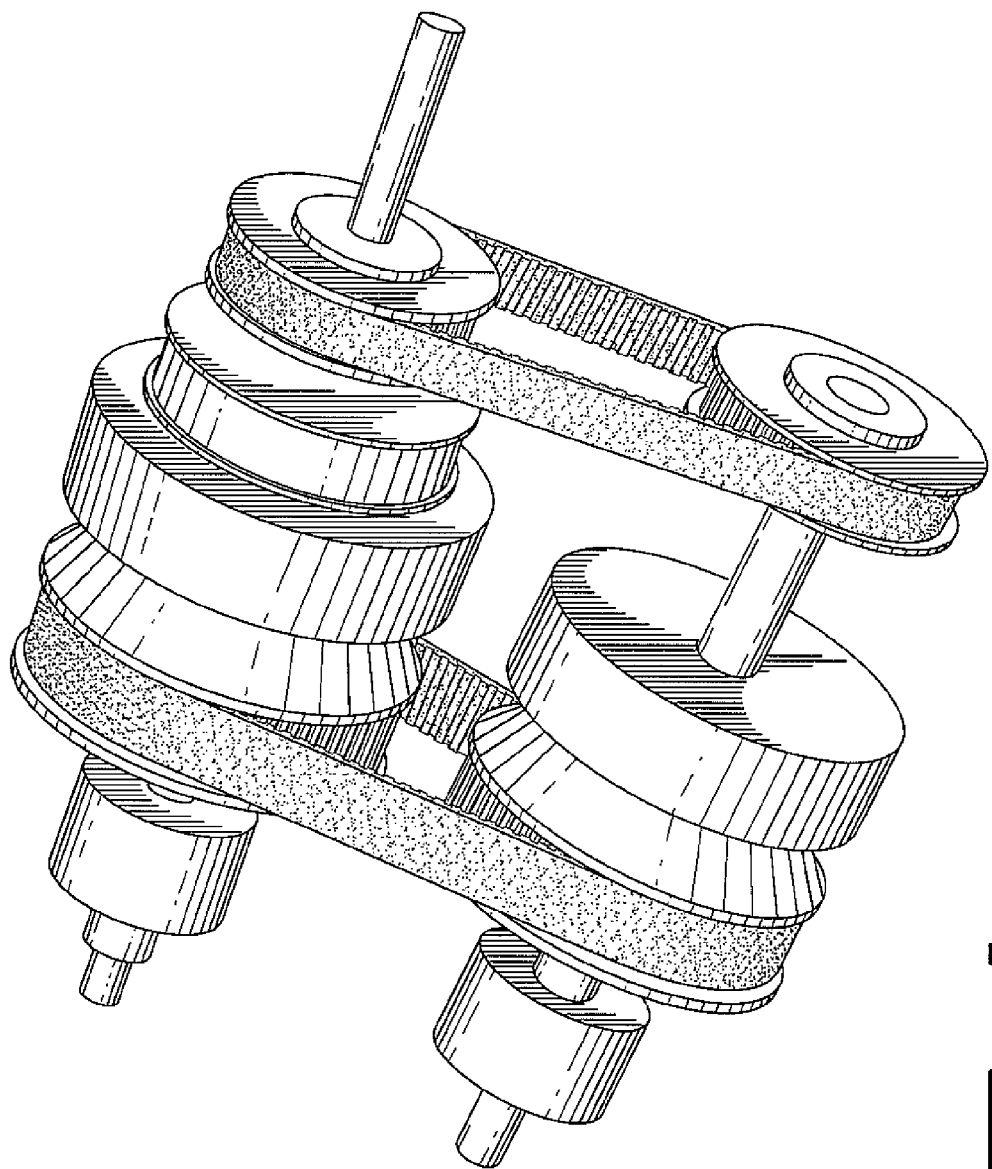
FIG. 3 is a perspective view of the coupled motor and generator of FIG. 2.

FIG. 3 illustrates a perspective view of the motor and generator coupling according to FIG. 2 to give a better understanding. This type of coupling is referred to as the stator-stator/rotor-rotor configuration.

The preferred coupling means are belts, but many other types of coupling means may be used, like gears and a chain. The generator and motor may share the same axis, thus sharing the same rotor shaft and the same stator body. Furthermore, gear ratios may be used to vary the quantity of rotations of a stator or rotor for each rotation of the corresponding stator or rotor.

Figure 4:
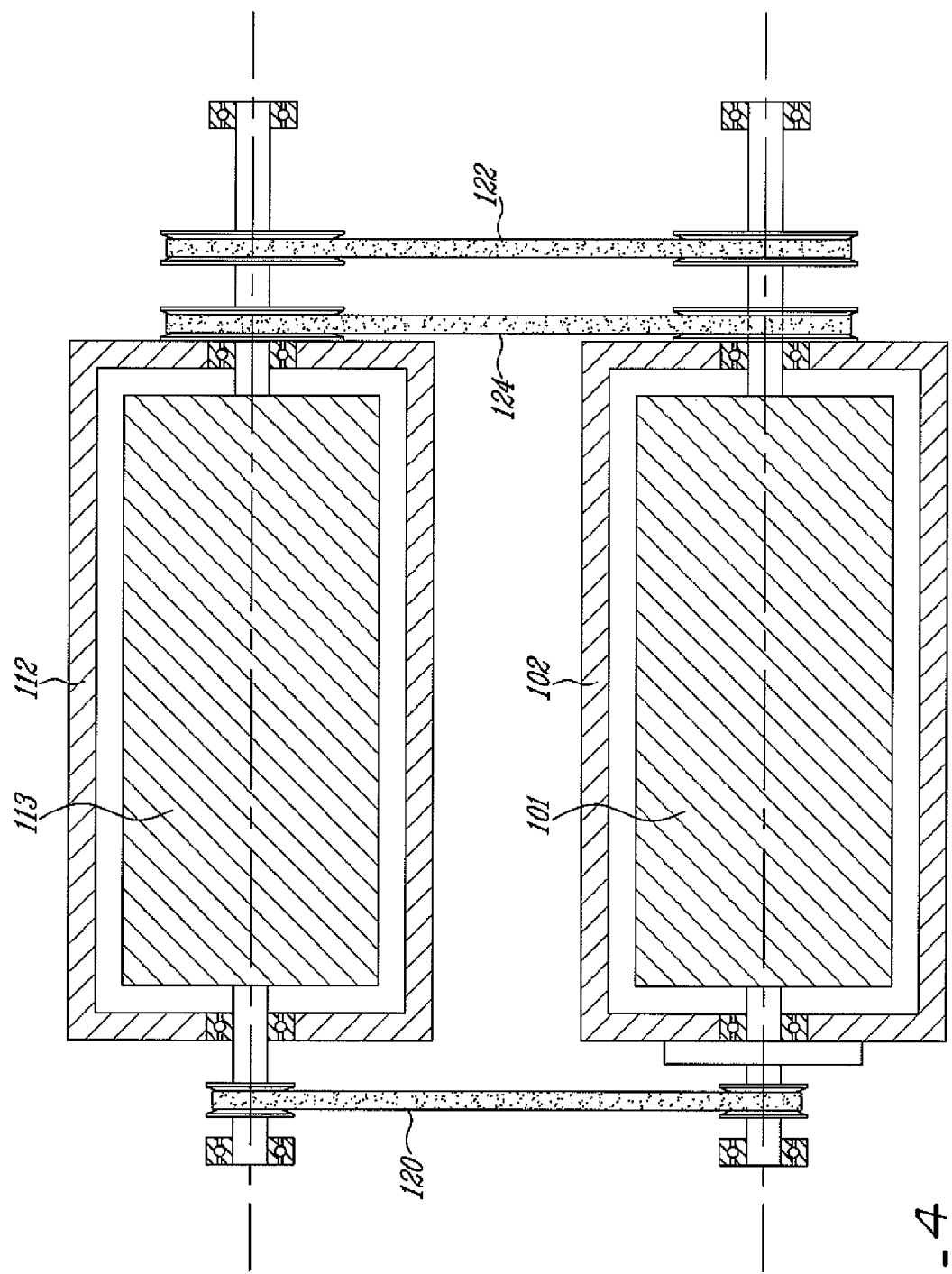
FIG. 4 is a cross-sectional view of a generator coupled to a motor according to another embodiment of the invention.

FIG. 4 illustrates the motor and stator of FIG. 2 coupled in another way. The motor is at the top of the figure and the generator at the bottom. For simplicity of reference, this configuration will be referred to as the stator-rotor configuration. The motor stator shaft is coupled both to the generator stator shaft, in a direct manner, and to the generator rotor shaft in an inverse rotation manner. The motor rotor is coupled to the generator stator.

Figure 5:
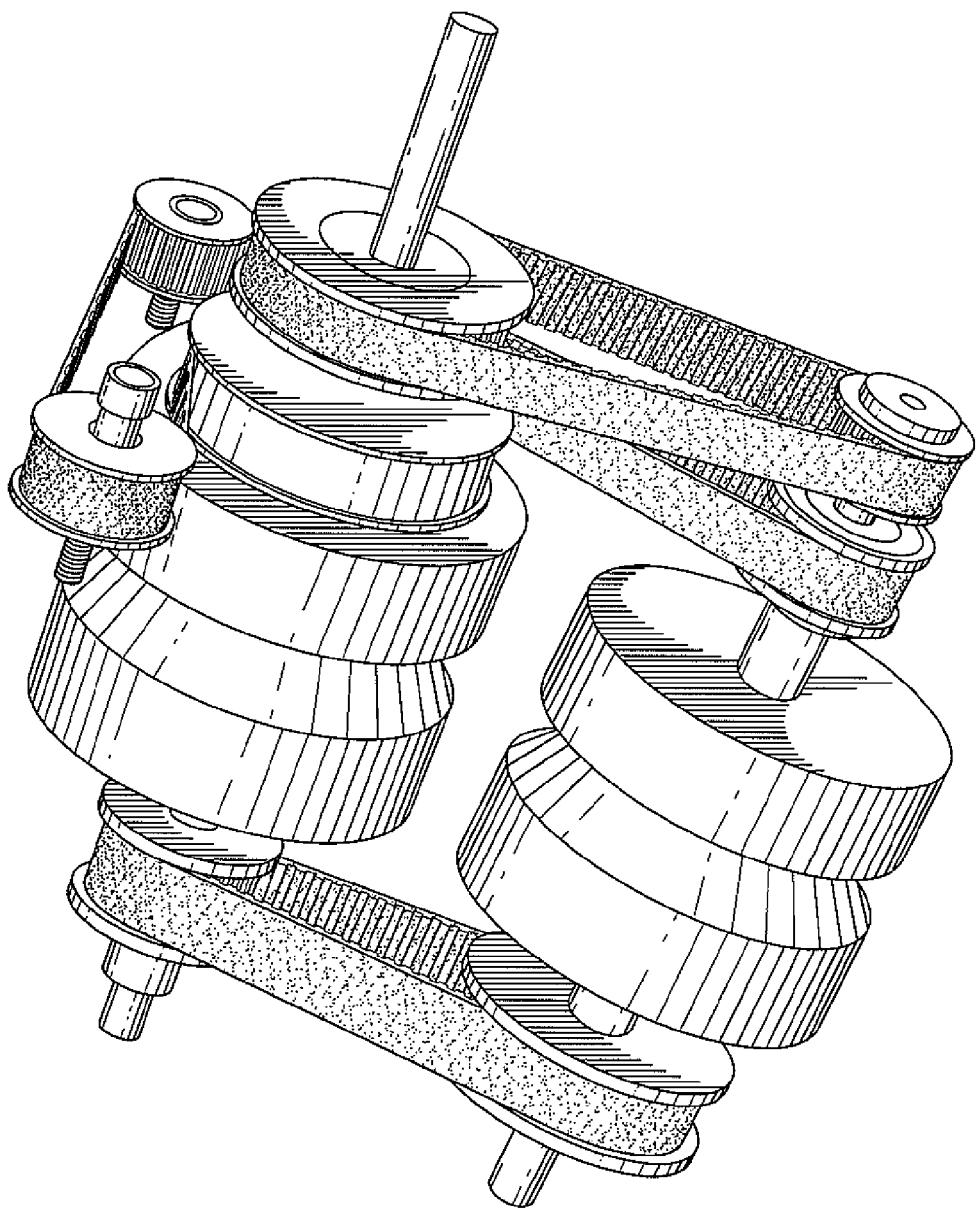
FIG. 5 is a perspective view of the generator coupled to the motor of FIG. 4.

FIG. 5 provides a perspective view of the configuration of FIG. 4. It is easier to see the different couplings between motor and generator. The inverse rotation is achieved by the illustrated planetary gear system.

EXAMPLE

A bi-rotary 1 force motor was coupled to a bi-rotary generator with both rotors and both stators directly coupled by two independent straps in a ratio of 1:1. At first, the generator output was not subjected to electrical resistance, and when the motor was powered, the rotors accelerated to high RPM. The stators were pivoting very slowly in the opposite rotational direction. In fact, since the stators are heavier than the rotors, and their mass is spaced further from the rotation axis, they have a much higher moment of inertia and do substantially not pivot.

Then, resistance in the form of light bulbs was added to the generator coils. The angular speed of the stators began increasing, whereas the angular speed of the rotors began decreasing accordingly. Although the speed differential between rotors and stators was kept approximately constant, the kinetic energy of the system increased due to the flywheel effect of the high moment of inertia pivoting of the stators.

Further increasing resistance at the generator resulted in a further increase of stator angular velocity, and further decrease of rotor angular velocity until the rotors came to a halt, and began spinning in the same direction as the stators with increasing velocity. The velocity differential was, however kept fairly constant.

Additionally, the motor stator was coupled to a rotating shaft in a ratio of coupling of 5:1. The flywheel effect of the motor stator was such that it was impossible for an adult man to hold the shaft with one hand. It is believed that using a second generator upon such a shaft could produce even more energy and further increase efficiency.

After a certain period of time, with the resistance kept constant, the velocity of the stators and rotors reached a certain equilibrium and stability. Then the motor was shut down. It took a certain period of time for the stators to be taken to a halt. Holding the stators immobile, the motor was turned back on and the rotors began pivoting anew. Once their equilibrium speed was reached, the amperage was measured to be 9 A. When the stators were released, they began pivoting and the energy consumption began decreasing. Once the stator reached its maximum speed, the energy consumption had decreased to 7 A.

Use of the above described system may be adapted to increase efficiency of mechanical to electrical energy conversion apparatus, like hydroelectric, wind, or gas power plants.

The 1 F motor used in the experiment could be replaced by a much stronger motor, and a correspondingly bigger generator. The flywheel effect of inertia accumulated energy of the stator of such a generator would be greatly increased. The energy accumulated in the stators may be used as a flywheel for conserving steady current output if a power surge is experienced in the motor, or to otherwise maintain steadiness. The stator energy may also be used to power a secondary generator, a compressor, an hydraulic pump, a fan, etc. The rotation of both moving parts of motors and alternators provide a better heat dissipation than a conventional generator which results in an increased production of energy.

What is claimed is:

1. An energy transfer apparatus for operating on electrical power comprising:
   a motor comprising a rotatable stator and a rotatable rotor, the rotor of the motor being supported for rotation about a common central axis with the stator of the motor under the influence of electromagnetic fields developed in the stator of the motor;
   a generator comprising a rotatable stator and a rotatable rotor, the rotor of the generator being supported for rotation about a common central axis with the stator of the generator under the influence of electromagnetic fields developed in the stator of the generator;
   means physically coupling one of
      the stator of the motor to the stator of the generator and the rotor of the motor to the rotor of the generator, and
      the stator of the motor to both the stator of the generator, in a direct manner, and to the rotor of the generator, in an inverse rotation manner, and the rotor of the motor to the stator of the generator;
   means for applying power from an external source to the stator of the motor; and
   at least one output shaft coupled to be driven by one of the stator and the rotor of the generator, whereby the output shaft can be driven at speeds in excess of the speed of the motor.

2. The apparatus as claimed in claim 1, wherein said at least one output shaft is used by a system to be energized.

3. The apparatus as claimed in claim 2 wherein said system is one of a compressor, a hydraulic pump, a fan, and a generator.

4. The apparatus as claimed in claim 1, wherein said external source is one of a wind powered turbine and a hydroelectric turbine.

5. A method for transferring energy, comprising:
   providing a motor comprising a rotatable stator and a rotatable rotor, the rotor of the motor being supported for rotation about a common central axis with the stator of the motor under the influence of electromagnetic fields developed in the stator of the motor;
   providing a generator comprising a rotatable stator and a rotatable rotor, the rotor of the generator being supported for rotation about a common central axis with the stator of the generator under the influence of electromagnetic fields developed in the stator of the generator;
   physically coupling one of
      the stator of the motor to the stator of the generator and the rotor of the motor to the rotor of the generator, and
      the stator of the motor to both the stator of the generator, in a direct manner, and to the rotor of the generator, in an inverse rotation manner, and the rotor of the motor to the stator of the generator;
   applying power from an external source to the stator of the motor; and
   coupling at least one output shaft to be driven by one of the stator and the rotor of the generator, whereby the output shaft can be driven at speeds in excess of the speed of the motor.

* * * * *